United States Patent [19]

Naito et al.

[11] Patent Number: 5,034,934
[45] Date of Patent: Jul. 23, 1991

[54] OPTO-MAGNETIC DISK UNIT WITH IMPROVED DYNAMIC RANGE CHARACTERISTICS AND OPTO-MAGNETIC DISK THEREFOR

[75] Inventors: Ryuichi Naito; Ikuya Kikuchi; Yoshihiro Utsumi, all of Saitama, Japan

[73] Assignee: Pioneer Electronic Corp., Tokyo, Japan

[21] Appl. No.: 297,727

[22] Filed: Jan. 17, 1989

[30] Foreign Application Priority Data

Jul. 15, 1988 [JP] Japan ............................ 63-176661
Jul. 15, 1988 [JP] Japan ............................ 63-176662

[51] Int. Cl.⁵ .................... G11B 13/04; G11B 11/12
[52] U.S. Cl. .................................. 369/13; 369/47; 360/59
[58] Field of Search ............... 369/13, 47, 48; 360/59, 360/114; 365/122

[56] References Cited

U.S. PATENT DOCUMENTS

| | | | |
|---|---|---|---|
| 4,730,289 | 3/1988 | Saitoh et al. | 369/47 |
| 4,733,385 | 3/1988 | Henmi et al. | 369/13 |
| 4,764,916 | 8/1988 | Mori | 369/59 |
| 4,789,972 | 12/1988 | Oldham | 360/114 |

Primary Examiner—Stuart S. Levy
Assistant Examiner—Hoa Nguyen
Attorney, Agent, or Firm—Sughrue, Mion, Zinn, Macpeak & Seas

[57] ABSTRACT

An opto-magnetic disk unit is constructed so that predetermined areas existing in the front of the unit recording areas can be detected. In addition, at least one of first and second saturation magnetizations are recorded on each of the detected predetermined areas. At the time of reproduction, signal processing on the output of the pickup is performed after a part of the output of the pickup corresponding to the one section of the predetermined area is clamped to a predetermined level. Also at the time of reproduction, gain controlling of a circuit for signal processing the output of the pickup may be performed based on the level difference between the signal read from a first saturation magnetization section and the signal read from a second saturation magnetization section. An opto-magnetic disk is also provided having recording areas including at least one of first and second magnetization saturation levels arranged in the front of the unit recording areas.

6 Claims, 6 Drawing Sheets

OPTO-MAGNETIC DISK UNIT WITH IMPROVED DYNAMIC RANGE CHARACTERISTICS AND OPTO-MAGNETIC DISK THEREFOR

BACKGROUND OF THE INVENTION

The present invention relates to an opto-magnetic disk unit and to an opto-magnetic disk. Specifically, the present invention provides an opto-magnetic disk unit offering good recording and reproducing characteristics using inexpensive and unerased disks without requiring a widened dynamic range in the circuit for reproducing recorded information. In addition, the invention provides an opto-magnetic disk corresponding to the opto-magnetic disk unit.

DESCRIPTION OF THE PRIOR ART

Recently, read-only type or write-once type optical disks have been used commercially, and writable type optical disks are approaching practical application. In any optical disk, the track pitch is very narrow, typically about 1 to 2 $\mu$m. As a result, concave or convex pits or grooves for tracing the track have been provided on the disk. The relationship between the relative positions of the track and the information-reading beam spot in the direction of the radius of the disk can be detected through light diffracted from the pits or grooves when the light emitted on the disk is reflected from the disk, thus allowing the tracking servo operation of tracking the beam spot to be accomplished. Further, the pits are used for clock generating information which is necessary to data recording or reproducing, for sector allocation information, for sector access information, for information required for dividing the sector into blocks, and the like. This kind of information can be read through diffraction of light due to the pits. The pits, prepared on the disk in advance for the purpose of obtaining information through diffraction of light as described above, are called "embossed pits".

An example of the arrangement of the embossed pits on the disk is shown in FIGS. 4 through 7.

In the format as shown in FIGS. 4 through 7, a track virtually spirally formed on the disk is divided into 1376 equiangular segments while the track makes a turn. Further, one sector is composed of 43 continuous segments. Accordingly, the one-turn track (one track) is composed of 32 sectors.

FIG. 4 is a view showing the segment arrangement in one sector. Each segment is composed of 18 bytes containing 2 bytes forming a servo area and 16 bytes forming a header or data area. The first segment has a header area of 16 bytes and each of the other segments from the second to the 43rd have a data area of 16 bytes. Each byte in the servo area, header area, and data area is divided into 15 channel bits.

FIG. 5 is a view showing the arrangement of the servo area. The servo area in one segment is composed of two bytes. The two bytes of the servo area are called "first servo byte" and "second servo byte". Two embossed pits are formed in the first servo byte. The embossed pits are shifted by approximately ¼ track pitch in opposite radial directions from the virtual track center. The first wobbled pit PW1 is formed in the position of the third or fourth channel bit alternatively every 16 tracks. The second wobbled pit PW2 is formed in the position of the 8th channel bit. A tracking error signal can be generated once every segment by sampling on the basis of the two wobbled pits. Assuming that a beam spot passes the virtual track center, then the beam spot passes the center between the two wobbled pits. Accordingly, the degrees of diffraction at the wobbled pits are equalized with respect to each other, so that the quantities of reflected light are also equalized. As a result, a tracking error signal obtained from the difference between signals obtained by photoelectric conversion from the quantities of reflected light becomes zero (no error). On the other hand, assuming that a beam spot passes out of the virtual track center, a difference is produced between the quantities of light reflected from the two wobbled pits. As a result, a tracking error signal can be obtained corresponding to the direction and quantity of the divergence. Because 1376 segments exist in one turn, the tracking error signal obtained from each servo byte by sampling is approximately equivalent to the signal obtained continuously. Consequently, tracking servo operation can be put into practice.

In the second servo byte, one embossed pit is formed in the position of the 12th channel bit and just on the virtual track center. This is called a "clock pit" (PC). One clock pit PC in each segment is arranged in a predetermined position within the servo area. Accordingly, a clock having the frequency of the channel bit rate can be generated by synchronizing a PLL with a signal periodically reproduced from the clock pits. When data is recorded, modulation is carried out on the basis of the clock. Similarly, when data is reproduced, demodulation is carried out on the basis of the clock.

The surface between the PW2 pits and PC functions as a mirror surface to make possible the generation of a stable focus error by sampling regardless of the presence of pits.

The distance between the pits PW2 and PC is a distance (19 channel bits) which cannot be obtained by a 4/15 modulation method as described later. Accordingly, segment synchronization can be made through detection of the distance.

FIG. 6 is a view showing the arrangement of the inside of the header area. In the first byte, a sync mark is composed of embossed pits. The sync mark is provided with pits formed in the second, seventh, eighth and ninth channel bits, so that the sync mark has a specific pattern which cannot correspond to any NRZ data in the conversion table of the 4/15 modulation method as described later. Accordingly, sector synchronization can be made through detection of the sync mark. In the second byte, a sector address in one track is shown by embossed pits. In the third to seventh bytes, a track address in the disk is shown by embossed pits. These have been modulated byte by byte in accordance with the 4/15 modulation method as described later. The 8th to 13th bytes form a reserved area to be used for unspecified purposes. The reserved area has no embossed pit, or in other words, the reserved area is provided as a mirror surface. The 14th to 16th bytes form a laser power control area. In the initial stage, the laser power control area has no embossed pit, i.e., it functions as a mirror surface. Although it is desirable that information is recorded or erased by applying suitable light power to the disk, the power control area may be used by tentatively applying recording or erasing power from the optical pickup to the area to thereby correct the quantity of power.

FIG. 7 is a view showing one data area. The data area has a length of 16 bytes. When information is not yet recorded, the data area is provided as a mirror surface having no embossed pit. The NRZ data is modulated byte-by-byte using the 4/15 modulation method as described later, and is recorded in this area. In the case of the write-once type of disk, recording is accomplished by physical changes such as forming holes in the recording film. In the case of a writable disk using the opto-magnetic effect (hereinafter called an "opto-magnetic disk"), such physical changes do not occur but rather changes such as inversion of the direction of the magnetic field of the recording film occur.

The data area in one sector has $16 \times 42 = 672$ bytes which are composed of user data and error correction codes. Detailed description thereof is not given here.

In the following, the 4/15 modulation method is described with reference to FIG. 8. According to the 4/15 modulation method, a byte is converted to 15 channel bits. Next, marks are recorded in four places (two places from uneven numbers and two places from even numbers, except the 15th channel bit) selected from the 15 places on the basis of a conversion table for one-to-one correspondence with respect to 256 combinations of the NRZ data. In the case of a write-once disk, holes are formed in the recording film. In the case of the opto-magnetic disk, the direction of magnetization of the recording film is inverted. As shown in FIG. 8, marks may adjoin each other (12th, 13th and 14th channel bits). If marks do not adjoin each other (9th and 12th channel bits), space for two channel bits (10th and 11th bits) or more is left between the marks. As an exception, in the case where marks are recorded in the 14th channel bit of a certain byte and the first channel bit of the next byte, the space for only one channel bit (15th channel bit) may be left between the marks. However, this does not adversely effect demodulation, because the 14th channel bit is never used for such a mark.

The demodulation of data by the 4/15 modulation method will now be described. A reproductive waveform corresponding to the mark is shown in FIG. 8. In the case where recording is accomplished by forming holes, light reflected at a mark position is darker than light reflected at another position (mirror surface). In the case where the medium used is not formed with holes, the amount of light may be changed in the reverse direction. However, according to the 4/15 modulation method, demodulation can be carried out as long as there is a difference between the level of the mark position and the level of the mirror surface. Accordingly, the reproductive waveform of FIG. 8 does not show the direction of change in reflected light but merely shows the voltage level at each point in the demodulation circuit, i.e., the peaks in the reproductive waveform may indicate either high reflectivity or low reflectivity.

In the case of an opto-magnetic disk, the mirror surface level is replaced by an erasing level. If mark positions are specified by two places from uneven numbers and two places from even numbers among the first 14 channel bits in a certain byte, demodulation can be perfected. Accordingly, if A/D conversion is made in the center bit of the channel bits within a range from the first to the 14th bits and then the thus obtained digital data are compared with each other, mark positions can be specified. For example, in FIG. 8, the 13th channel bit is highest in level among the first, third, fifth, seventh, ninth, eleventh and thirteenth channel bits and the ninth bit is the second highest in level. (In this example, the 14th channel bit of this byte and the first channel bit of the next byte are used for marks. Accordingly, the level of the 14th channel bit may be higher than the level of the 9th channel bit. However, the 14th channel bit is not recognized as a target of comparison, because the 14th channel bit is never used for such a mark. Therefore, there is no adverse effect at the time of demodulation.) Consequently, it can be recognized that marks in uneven numbers exist in the 9th and 13th channel bits. Similarly, it can be recognized that marks in even numbers exist in the 12th and 14th channel bits. The original NRZ data can be demodulated from these four marks on the basis of the conversion table.

In short, the demodulation by the 4/15 modulation method is based on comparison of reproductive levels with respect to the center of the channel bits.

In the following, the opto-magnetic disk is described briefly. Portions to be formed as embossed pits are prepared on a raw glass disk by mastering in the same manner as in the case of write-once type optical disk. Then a stamper is prepared by electroforming. Next, a substrate having embossed pits is prepared by injection molding of polycarbonate resin or other materials using the stamper as a mold. A thin film of TbFeCo alloy or other materials is formed as a recording film on the substrate by a method such as sputtering, to thereby prepare an opto-magnetic disk as shown in FIG. 9.

In the prepared opto-magnetic disk as shown in FIG. 9, the recording film 1 has, in general, a uniform reflectivity on the order of several tens %. Accordingly, light having uniform intensity is reflected at the mirror surface portion 2 having no embossed pits. By the phenomenon of diffraction, the quantity of light reflected at the embossed pit portion 3 is reduced by about several tens % with respect to the mirror surface portion 2. The reference numeral 4 designates the substrate.

The recording principle in an opto-magnetic disk will now be described briefly. In the initial stage, just after the recording film is formed by the method such as sputtering, the domains of the recording film are arranged at random in the upward and downward directions perpendicular to the film surface. In general, a magnetic field Hm more intensive than the coercive force Hc of the film is applied to the initial-stage disk to orient magnetization to one direction (erasing direction). Thus, a silent disk (erased over the whole surface) can be prepared. In the case where information should be recorded in this disk through an opto-magnetic disk unit (hereinafter called a "drive"), an intensive recording beam is applied only when a mark is to be recorded in a channel bit while a magnetic field Hr weaker than Hc and reverse in direction to Hm is applied. As the temperature of the portion receiving the beam spot rises, the coercive force becomes less than Hr. As a result, the direction of magnetization is reversed. After the beam spot passes, the direction of magnetization in the portion returns to the direction of Hr. Thus, a mark can be recorded.

In the case where recorded data should be erased through the drive, an intensive erasing beam is applied while a magnetic field He weaker than Hc and in the same direction as Hm is applied. The portion subject to the erasing beam is changed so that the direction of magnetic field becomes that of the erasing state. Thus, a mark can be erased.

In the case of reproduction, a linearly polarized reproductive beam weaker than the recording beam and the erasing beam is applied. The plane of polarization in the reflected light is slightly rotated by the Kerr effect while the direction of rotation depends on the direction of magnetization. The direction of rotation is detected as the change of intensity by an analyzer and converted photoelectrically, to thereby attain a potential difference between the mark position and the other position.

In general, a differential optical system is used as an optical system for detecting the reproductive signal of the opto-magnetic pickup. According to the differential optical system (not shown in the drawing), light reflected from the disk is divided into two series by a polarization beam splitter to measure a difference between the signals respectively obtained by photoelectric conversion, resulting not only in the acquisition of an opto-magnetic reproductive signal, but also in the suppression of semiconductor noise and in-phase noise such as fine reflection irregularity from the disk. It is well known that the optical system is indispensable as a reproductive optical system for the opto-magnetic signal. The reproductive signal for the embossed pit is obtained by calculating the sum of two series signals.

In the case where data recorded on the opto-magnetic disk having the aforementioned format should be demodulated, first the distance between embossed pits PW2 and PC as shown in FIG. 5 is detected to perform segment synchronization. Then the sync mark as shown in FIG. 6 is detected to perform sector synchronization. For example, as shown in FIG. 8, the opto-magnetic signal reproductive waveform in each byte is compared after A/D conversion, allowing the determination of the position of the recorded mark (channel bit in which the direction of magnetization is reversed the erasing state). Thus, demodulation of recording data can perfected.

In general, in the optical disk, data is not sequentially recorded in each sector as a recording minimum unit but is recorded at random in each section. Accordingly, a recorded sector may appear immediately after non-recorded sectors are continued.

In an opto-magnetic disk drive unit, a reproductive signal can be obtained through detection of the fine change of the Kerr rotation angle, so that the amplitude of the signal read by the pickup is very small. Accordingly, the signal must be substantially amplified to make signal processing in the posterior stage possible. Accordingly, an AC amplifier must be used. A circuit for performing demodulation after amplification by an AC amplifier is shown in FIG. 10.

In FIG. 10, the opto-magnetic reproductive signal a (in the case of a differential optical system, the signal obtained from the difference between two channels) generated from a pickup (not shown) is amplified by an amplifier 5 to be fed to an analog-to-digital (hereinafter abbreviated to "A/D") converter 6 through a capacitor $C_1$. A resistor $R_1$ is connected between the input terminal of the A/D converter 6 and the ground. After the opto-magnetic reproductive signal a is converted to digital data by the A/D converter 6, the digital data is fed to a demodulation circuit (not shown) for 4/15 demodulation.

In the case of an opto-magnetic disk, magnetization in the perfectly erased portion is oriented to a predetermined direction. To the contrary, magnetization in the perfectly recorded portion is oriented in the reverse direction. In short, two saturation states exist. However, the initial-stage disk prepared by forming a recording film by a method such as sputtering is in an uncertain state between the perfectly erased state and the perfectly recorded state, because magnetization is in random directions.

Assuming now that a disk is prepared by forming the recording film without the wholly erasing procedure of applying a magnetic field Hm more intensely than the coercive force Hc of the film, the waveform of the opto-magnetic reproductive signal a obtained by the pickup in the vicinity of a recorded sector in the disk is as shown in FIG. 11(A).

In the non-recorded sector, neither recording nor erasing have been carried out yet. Accordingly, the level of the opto-magnetic reproductive signal a is an unfixed level between the recording saturation level $V_R$ corresponding to the recording saturation state and the erasing saturation level $V_E$ corresponding to the erasing saturation state. As a result, the level of the opto-magnetic reproductive signal a obtained from the non-recorded sector may be so near the recording saturation level $V_R$ that the waveform may be as shown in the solid line, or the level may be so near the erasing saturation level $V_E$ that the waveform may be as shown in the dot-and-dash line. On the other hand, in the case of a recorded sector, marks have been recorded in channel bits corresponding to data after erasing has been performed by the drive, so that the level of the opto-magnetic reproductive signal a changes within a range between the recording saturation level $V_R$ and the erasing saturation level $V_E$ corresponding to the mark position. In FIG. 11, let e represent the level difference between the recording saturation level $V_R$ and the erasing saturation level $V_E$.

The waveform of the input signal b of the A/D converted 6 to which the opto-magnetic reproductive signal a is fed through the capacitor $C_1$ forming an alternating-current coupling is as shown in FIG. 11(B). During the reading of a non-recorded sector, the level of the input signal b of the A/D converter 6 is almost at ground whether the level of the opto-magnetic reproductive signal a is near $V_R$ or near $V_E$. However, when the information-reading beam spot enters into a recorded sector, the level of the input signal b varies within a range between -e and ground as shown in the solid line if the level of the previous opto-magnetic reproductive signal a is near $V_R$. On the other hand, when the information-reading beam spot enters into a recorded sector, the level of the input signal b varies within a range between ground and +e as shown in the dot-and-dash line if the level of the previous opto-magnetic reproductive signal a is near $V_E$. Accordingly, a dynamic range of 2e is required for the A/D converter 6 though the amplitude of the signal is e at the maximum. In order to widen the dynamic range of the A/D converter 6 and maintain good resolution, one extra bit is required. However, the A/D converter for performing A/D conversion in a short period (about 90 ns in the case of the a disk rotating at 30 rpm) in every channel bit becomes more expensive if the bit number increases by one.

Here, it is considered that the disk prepared, by forming a recording film by sputtering is first completely erased by applying a magnetic field Hm more intensive than the coercive force Hc of the film. By such an erasing procedure, the level of the opto-magnetic reproductive signal a at a non-recorded sector as shown in FIG. 11(A) is always equalized to the erasing saturation level $V_E$, causing the level of the opto-magnetic reproductive signal a at a following recorded sector to always vary within a range between ground and +e. However, to erase the whole surface of the disk, a magnetic field Hm sufficiently more intensive than the coercive force Hc of the film must be applied to the whole surface of the disk. (In general, the coercive force Hc of the recording film is large to prevent flux from leaking out of the actuator, spindle motor and other parts of the drive, so that Hm becomes very large.) Therefore, the necessary apparatus is very large. In addition, processes for individually erasing disks and for checking them are required, so that the cost of the disk increases. As another method, a method of easing the whole surface of the disk by applying a magnetic field weaker than Hm while heating the disk may be considered. However, the temperature of the disk is limited in the case where the substrate is formed of resin. Further, it is a matter of course that equipment and time are required for heating the disk.

Further, in the case where recorded sectors are continued for a long time, sagging due to the alternating-current coupling as shown in FIG. 12 appears gradually at the input signal b of the A/D converter 6, even if the whole surface has been preliminarily erased. Accordingly, the dynamic range must be more than e.

Although above description has been given on the assumption that e is constant, the drive is required to reproduce various optical disks perfectly because the optical disks are interchangeable. Therefore, the dynamic range of the A/D converter must be determined on the basis of the maximum value of e. Accordingly, in the case where the value of e is reduced in some disks, the resolution power of the A/D converter is reduced so that the error rate may suffer.

SUMMARY OF THE INVENTION

It is therefore an object of the present invention to provide a opto-magnetic disk unit in which good recording/reproducing can be obtained with an inexpensive opto-magnetic disk without widening the dynamic range of the circuit for reproducing recorded information.

To attain the foregoing object of the invention, the opto-magnetic disk unit according to the invention is constructed so that predetermined areas existing in the front of the unit recording areas can be detected. In addition, at least one of a first saturation magnetization section where the magnetization is oriented to a first predetermined direction and a second saturation magnetization section where the magnetization is oriented to a second predetermined direction can be formed on each of the detected predetermined areas.

At the time of reproduction, signal processing on the output of the pickup may be performed after a part of the output of the pickup corresponding to the one section of the predetermined area is clamped to a predetermined level.

Also at the time of reproduction, gain controlling of a circuit for signal processing the output of the pickup may be performed based on the level difference between the signal read from the first saturation magnetization section and the signal read from the second saturation magnetization section.

DETAILED DESCRIPTION OF THE PREFERRED EMBODIMENT

The present invention will be described in detail with reference to FIGS. 1 through 3.

Figure 1:
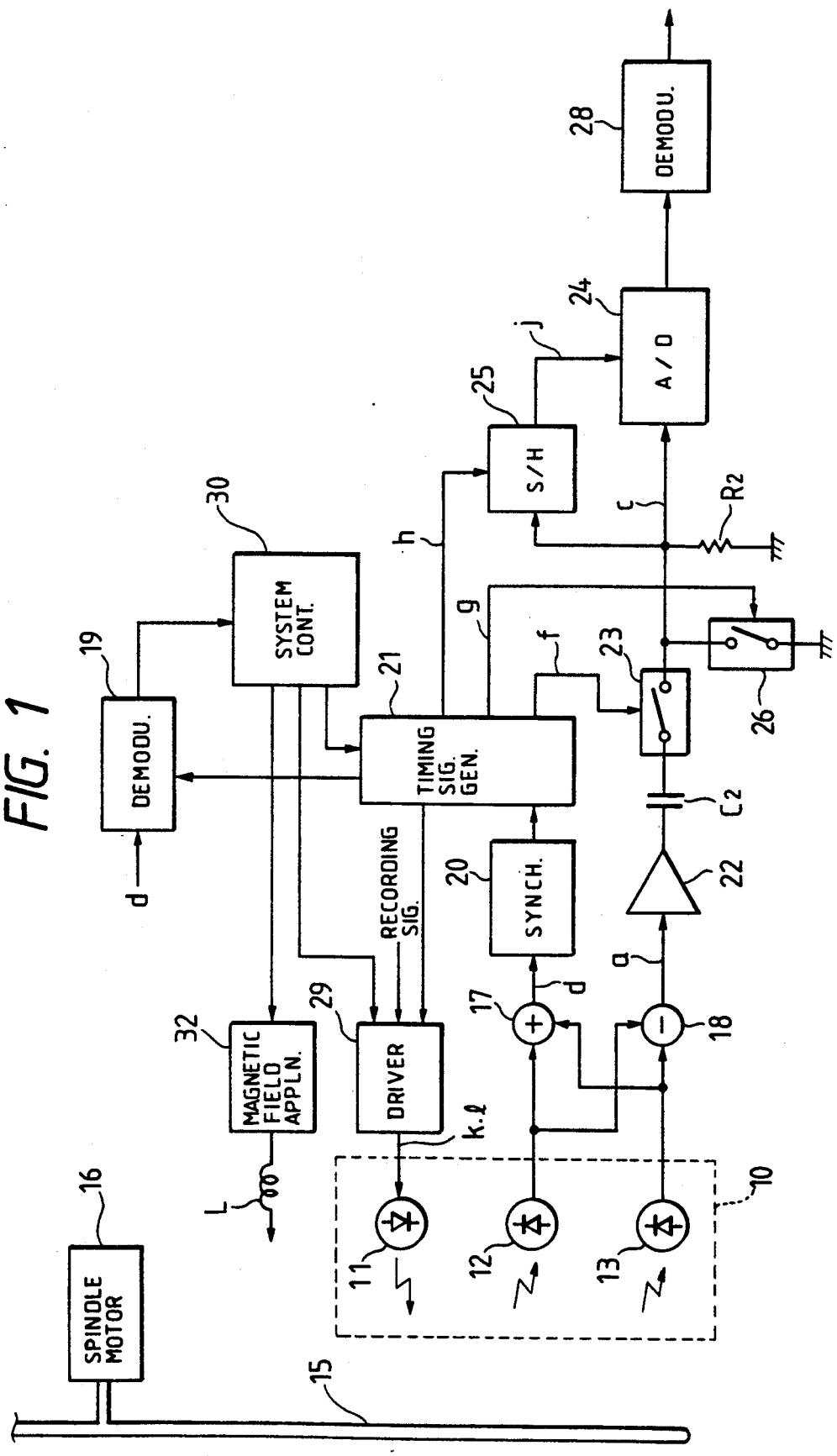
FIG. 1 is a view showing an embodiment of the present invention.
Figure 2:
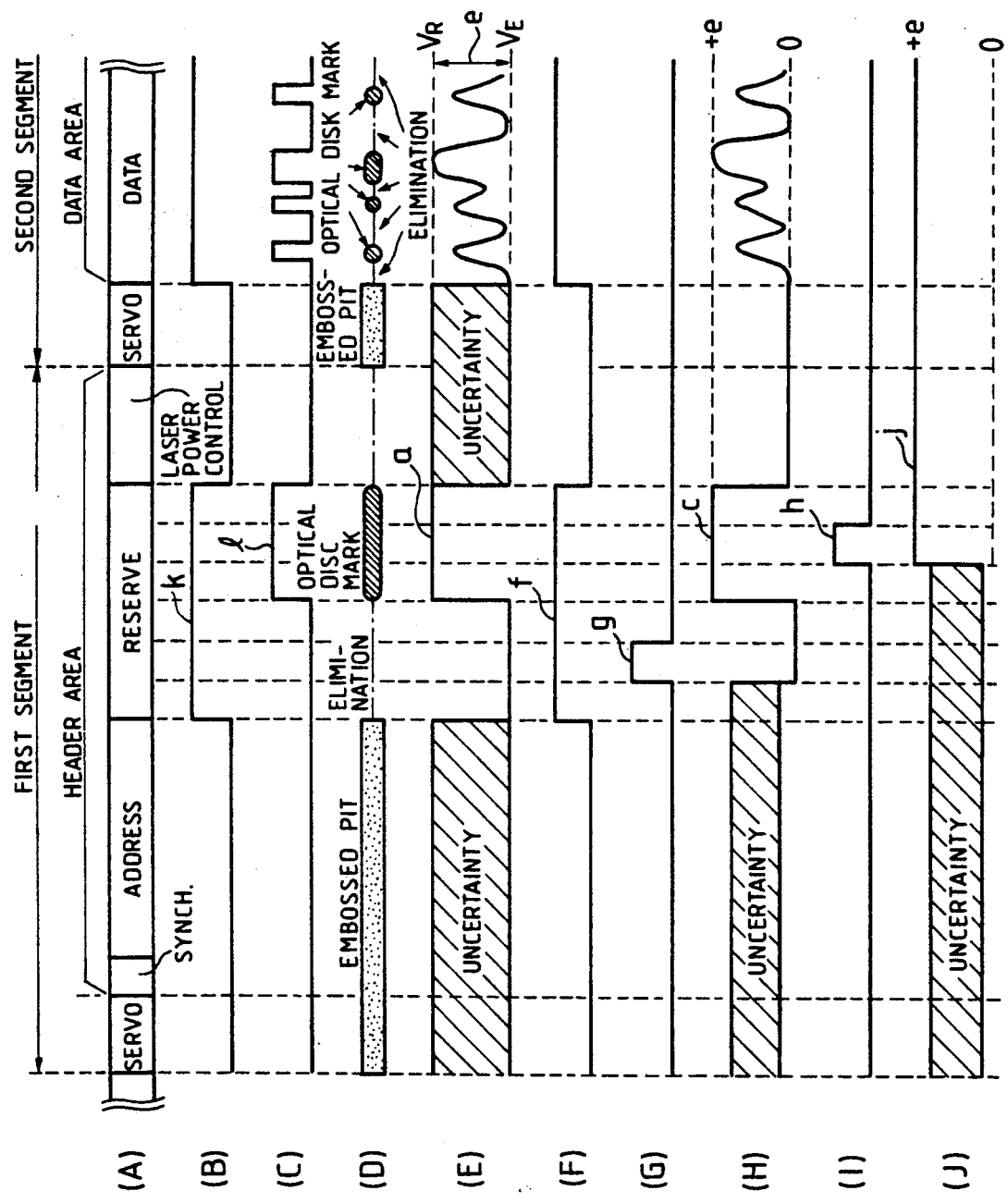
FIG. 2 is a timing chart showing the operation of parts in the disk unit of FIG. 1.

In FIG. 1, the reference numeral 10 designates an opto-magnetic pickup which includes a semiconductor laser 11 as a light source and light-receiving elements 12 and 13 for receiving two channels of light in a differential optical system to undergo photoelectric conversion. For example, the light-receiving elements 12 and 13 serve to detect laser light emitted from the semiconductor laser 11 and reflected by an opto-magnetic disk 15 through analyzers. In particular, one of the light-receiving elements serves to detect the plus component of the Kerr rotation angle and the other serves to detect the minus component of the Kerr rotation angle. The opto-magnetic disk 15 is rotated at a predetermined speed by a spindle motor 16 controlled by a spindle servo circuit (not shown). The pickup 10 further includes a focus actuator and a tracking actuator, which are driven by a focus servo circuit and a tracking servo circuit, respectively. By the action of the aforementioned servo circuits, laser light emitted from the semiconductor laser 11 is exactly converged on a recording surface of the opto-magnetic disk 15 to form a beam spot which accurately traces a track of the disk. The servo circuits are not shown in the drawing as they are known in the art.

The output signals of the light-receiving elements 12 and 13 are added to each other by an adder 17 to form an embossed pit reproductive signal d. At the same time, the output signals of the light-receiving elements 12 and 13 are subtracted from each other by a subtracter 18 to form an opto-magnetic reproductive signal a.

The embossed pit reproductive signal d is fed to a 4/15 demodulation circuit 19 and a synchronization circuit 20. The synchronization circuit 20 serves to generate both a segment sync signal and a sector sync signal on the basis of the embossed pit reproductive signal d. The segment sync signal and the sector sync signal from the synchronization circuit 20 are fed to a timing signal generation circuit 21. The timing signal generation circuit 21 serves to generate various kinds of timing signals on the basis of both the segment sync signal and the sector sync signal and to feed the timing signals to respective parts. The 4/15 demodulation circuit 19 serves to demodulate a part corresponding to the embossed pit of the embossed pit reproductive signal d containing sector address information and track address information in the header area, and to send out data expressing sector address and track address.

On the other hand, the opto-magnetic reproductive signal a is amplified by an amplifier 22 and is then fed to an A/D converter 24 and a sample and hold circuit 25 through an AC coupling capacitor $C_2$ and an analog switch 23. An analog switch 26 and a resistor $R_2$ are connected between an input terminal of the A/D converter 24 and ground. ON instruction signals f and g from the timing signal generation circuit 21 are fed to the analog switches 23 and 26, respectively. A sampling pulse h from the timing signal generation circuit 21 is fed to the sample and hold circuit 25.

The output j of the sample and hold circuit 25 serves as the full-scale input of the A/D converter 24. The A/D converter 24 is constructed so that the dynamic range can be determined to be from ground to the full-scale input level. The output data of the A/D converter 24 is fed to a 4/15 demodulation circuit 28.

A driving signal from a driving circuit 29 is fed to the semiconductor laser 11 in the pickup 10. A timing signal from the timing signal generation circuit 21 is fed to the driving circuit 29 and, at the same time, various kinds of instructions from a system controller 30 and recording signal from a 4/15 modulation circuit (not shown) are fed to the driving circuit 29. The driving circuit 29 continuously generates a constant-level signal having an amplitude corresponding to low-level laser power for reading information. At the same time, driving circuit 29 responds to various instructions from the system controller 30 as follows: superimpose a driving pulse signal k having an amplitude corresponding to the erasing-time laser power on the constant-level signal synchronously with the timing signal in response to the erasing instructions; superimpose a driving pulse signal 1 having an amplitude corresponding to the recording-time laser power on the constant-level signal in response to the recording instructions on the basis of the recording signal generated from the 4/15 modulation circuit (not shown); and superimpose the driving pulse signal 1 on the constant-level signal in response to the forced irradiation instructions.

The various kinds of instructions from the system controller 30 are further fed to a magnetic field application circuit 32. The magnetic field application circuit 32 serves to feed a driving signal to a coil L in a magnetic field application mechanism corresponding to the instructions. When erasing instructions are given, an erasing magnetic field He having a predetermined intensity is generated by the magnetic field application circuit 32 and the coil L. When recording instructions or forced irradiation instructions are given, a recording magnetic field Hr reverse to the erasing magnetic field He is generated by the magnetic field application circuit 32 and the coil L.

The system controller 30 is formed of a microcomputer comprising a processor, ROM, and RAM. Further, the output data of the 4/15 demodulation circuit 19 is fed to the system controller 30. Through the processor operating in accordance with a program stored in the ROM, the system controller 30 generates various kinds of instructions as follows.

In the case of data recording, the system controller 30 detects a sector in which data will be recorded, on the basis of the output data of the 4/15 demodulation circuit 19. When the sector is detected, the system controller 30 detects an area of from the eighth byte to the thirteenth byte in the header area (that is, a reserved area in the header area) and respective data areas from the second segment to the 43rd segment on the basis of the timing signal from the timing signal generation circuit 21, so that erasing instructions are sent to the driving circuit 29 and the magnetic field application circuit 32.

When a beam spot passes the recording sector as shown in FIG. 2(A), the driving pulse signal k having an amplitude corresponding to the erasing-time laser power is superimposed on the constant-level signal always fed to the semiconductor laser 11 as shown in FIG. 2(B), so that the reserved area and respective data areas of from the second segment to the 43rd segment are erased.

Then the system controller 30 once more detects a sector in which data will be recorded on the basis of the output data of the 4/15 demodulation circuit 19. After the detection of the sector is complete, the system controller 30 detects an area from the 11th byte to the 13th byte in the header area on the basis of the timing signal so that forced irradiation instructions are sent to the driving circuit 29 and the magnetic field application circuit 32, whereafter the system controller 30 detects respective data areas from the second segment to the 43rd segment so that recording instructions are sent to the driving circuit 29 and the magnetic field application circuit 32.

As a result, the driving pulse signal 1 having an amplitude corresponding to the recording-time laser power is superimposed on the constant-level signal always fed to the semiconductor laser 11 as shown in FIG. 2(C), so that a mark is recorded in an area from the 11th byte to the 13th byte in the header area, that is, an area represented by the last three bytes in the reserved area. In addition, marks corresponding to the recording signal are recorded in respective data areas of from the second segment to the 43rd segment.

Figure 3:
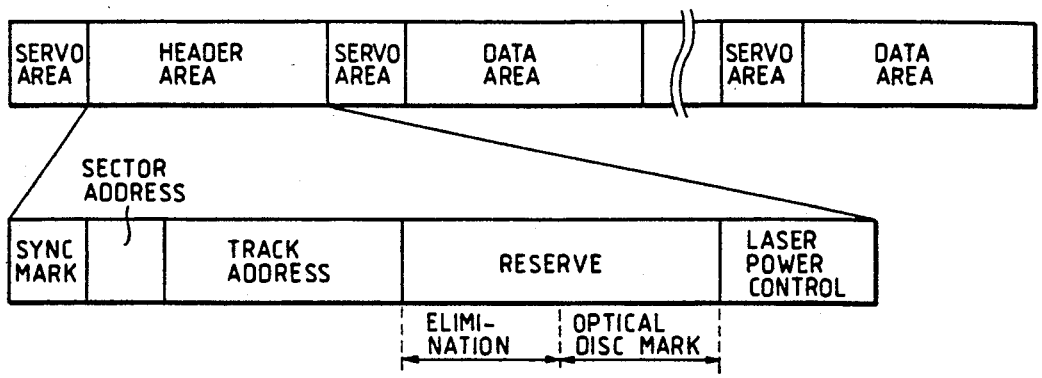
FIG. 3 is a view showing a disk in which information has been recorded by the disk unit of FIG. 1.
Figure 4:
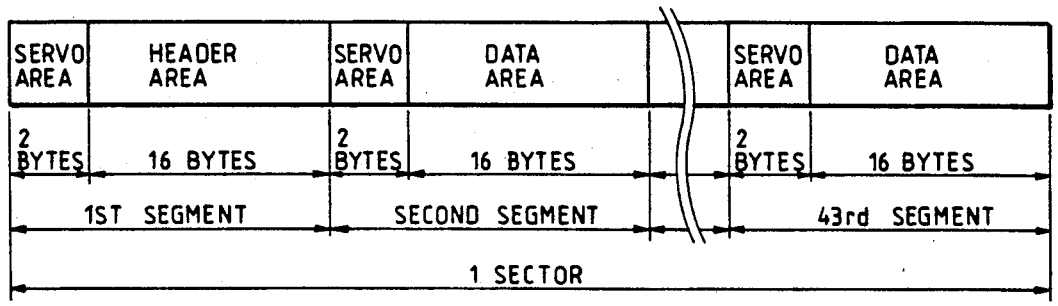
FIGS. 4 through 7 are views showing recording format of the opto-magnetic disk.
Figure 5:
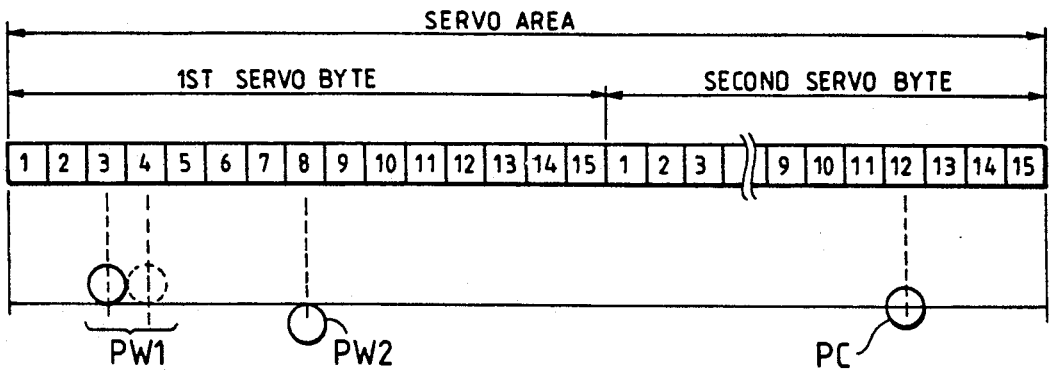
Figure 6:
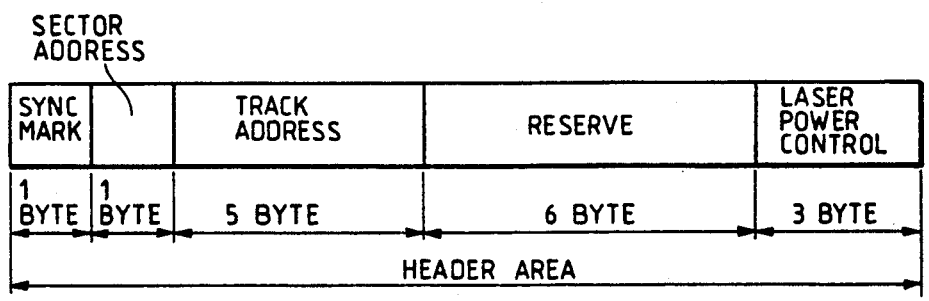
Figure 7:
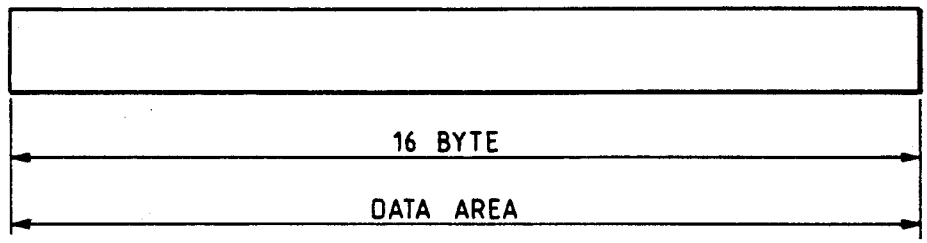
Figure 8:
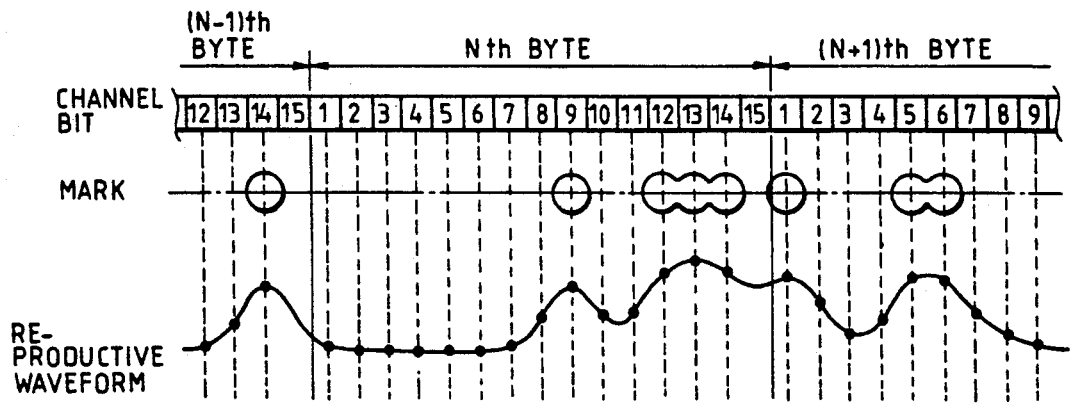
FIG. 8 is a view showing the relationship between the recording state of the data area and the waveform of the read-out signal.
Figure 9:
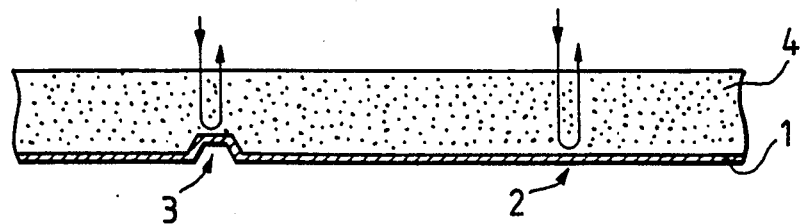
FIG. 9 is a sectional view showing the structure of the opto-magnetic disk.
Figure 10:
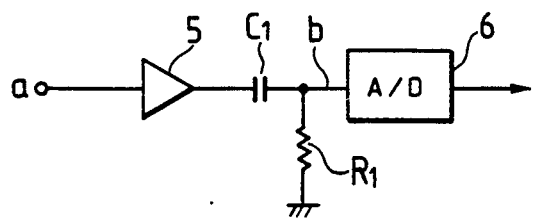
FIG. 10 is a block diagram showing a reproducing circuit in a prior art disk unit.
Figure 11:
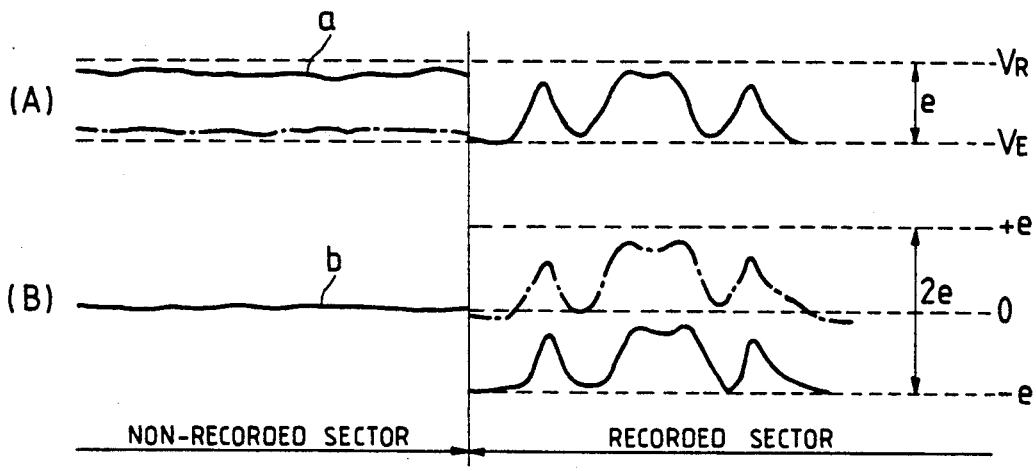
FIGS. 11 and 12 are waveform views showing the operation of parts in the circuit of FIG. 10.
Figure 12:
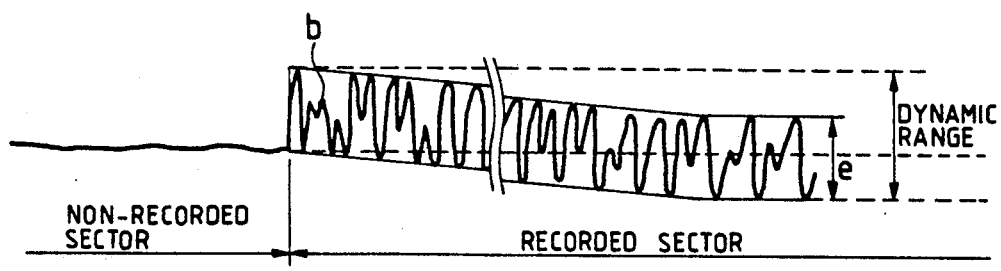
Figure 13:
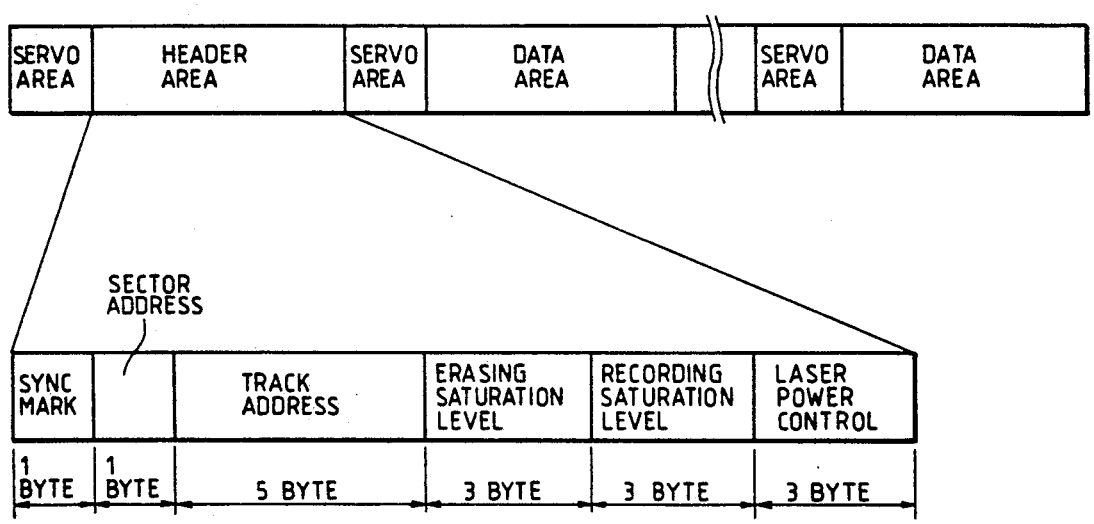
FIG. 13 is a view showing an embodiment of the present invention.

Thus, the track state is changed as shown in FIG. 2(D), resulting in the preparation of a recording disk as shown in FIG. 3.

The segment arrangement of one sector in the opto-magnetic disk having information recorded by the apparatus of the present invention as shown in FIG. 3 is in accordance with the format as shown in FIGS. 4 to 7. However, the first three bytes of the reserved area in the header area are in an erasing saturation state and the last three bytes thereof are in a recording saturation state.

In the case of data reproduction, the system controller 30 sends reading instructions to the driving circuit 29 and the magnetic field application circuit 32. As a result, a constant-level signal having an amplitude corresponding to the low-level laser power for reading information is solely fed to the semiconductor laser 11, so that the opto-magnetic reproductive signal a as shown in FIG. 2(E) is generated from the subtraction circuit 18. The level of the opto-magnetic reproductive signal a is unfixed at the embossed pit portion and at the laser power control portion in which erasing has not yet occurred. However, the level of the signal a is equal to the erasing saturation level $V_E$ at the first three bytes and equal to the recording saturation level $V_R$ at the last three bytes. On the other hand, the level of the opto-magnetic reproductive signal a at the data areas varies within a range between the erasing saturation level $V_E$ and the recording saturation level $V_R$.

If an ON instruction signal f related to the reserved area of six bytes and to respective data areas from the second segment to the 43rd segment is fed to the analog switch 23, abnormal electric charge due to the unfixed level of the opto-magnetic reproductive signal a is not accumulated in the capacitor $C_2$. Because the analog switch 26 with the capacitor $C_2$ serves as a clamping circuit, the erasing saturation level of the input signal c of the A/D converter 24 is clamped to ground if the ON instruction signal g related to the second byte of the reserved area is fed to the analog switch 26 as shown in FIG. 2(G). Accordingly, the recording saturation level of the input signal c of the A/D converter 24 due to the last three bytes of the reserved area becomes +e, so that the level of the input signal c of the A/D converter 24 related to the data areas varies within a range between the ground level and +e. Accordingly, A/D conversion can be carried out in the A/D converter 24, regardless of the state of the previous sector, unerased, erased or recorded. As a result, the dynamic range of the A/D converter 24 can be established to be between ground and +e at all times.

If a sampling pulse h is fed to the sample and hold circuit 25 only in the period of the fifth byte of the reserved area as shown in FIG. 2(I), the level of the opto-magnetic reproductive signal a at the last three bytes of the reserved area becomes equal to the recording saturation level $V_R$ so that +e is applied to the sample and hold circuit 25 because the input signal c of the A/D converter 24 is prepared by clamping the opto-magnetic reproductive signal a through the analog switch 26 and the capacitor $C_2$ by reference to ground. Accordingly, during one sector following this, the output j of the sample and hold circuit 25 is kept in the level of +e. Because the output j of the sample and hold circuit 25 serves as the full-scale input of the A/D converter 24, the A/D converter 24 makes A/D conversion of the opto-magnetic reproductive signal a in a range between the erasing saturation level $V_E$ and the recording saturation level $V_R$ as the full scale. Therefore, an automatic gain control function is operated to perform A/D conversion in the optimum dynamic range at all times, though the level difference between the erasing saturation level $V_E$ and the recording saturation level $V_R$ varies according to the scatter in disks or the scatter in drives.

Although the format as shown in FIGS. 4 through 7 has been described, it is a matter of course that the present invention is not limited to the aforementioned specific format and is applicable to other formats. For example, the same effect can be attained if at least one of the erasing saturation level and the recording saturation level can be recorded in an area prior to data recording areas in a sector as a minimum record unit.

In addition, although the aforementioned embodiment has shown the case where erasing and recording operations are carried out independently, it is a matter of course that so-called overwriting operation may be used in the present invention for the purpose of carrying out erasing and recording operations at once if the erasing saturation level and the recording saturation level can be written at once.

Although the aforementioned embodiment has shown the case where both the erasing saturation level and the recording saturation level are recorded in the reserved area, the invention is applicable to the case where at least one of the erasing saturation level and the recording saturation level may be recorded. In this case, the aforementioned automatic gain control function cannot be attained. However, the dynamic range of the A/D converter can be reduced because clamping is possible.

Finally, although the aforementioned embodiment has shown the case where the disk unit has the double function of recording and reproducing information, the invention is applicable to the case where the drive unit may serve as a recording-only unit or as a reproducing-only unit because media used in the opto-magnetic disk unit are interchangeable.

As described above in detail, according to the opto-magnetic disk unit of the present invention, at least one of a first magnetization saturation section where the magnetization is oriented to a first predetermined direction and a second saturation magnetization section where the magnetization is oriented to a second predetermined direction is formed in a predetermined area existing in the front of each unit recording area after the predetermined area is detected. Next, by clamping to a predetermined level a part of the output of the pickup corresponding to the one section in the aforementioned predetermined area when information is reproduced from the prepared disk, the level of a signal obtained from each unit recording area can be limited within a range from the predetermined level to a level varying from the predetermined level by the level difference between the first and second magnetization saturation sections. Accordingly, good recording/reproducing can be obtained by the use of fully unerased and inexpensive disks without the necessity of widening the dynamic range of the circuit for reproducing recorded information. Further, the dynamic range of the A/D converter in the circuit for reproducing recorded information can be used effectively to prevent increased manufacturing costs of the opto-magnetic disk unit.

Further, by carrying out gain control of the circuit for signal processing of the output of the pickup corresponding to the level difference between respective signals read from the first and second magnetization saturation sections at the time of reproduction, good signal processing in the optimum dynamic range can be made though the level difference between respective signals read from the first and second magnetization saturation sections varies due to the scatter in disks and other causes.

The present invention also provides an opto-magnetic disk in which the dynamic range of the circuit for reproducing recorded information can be reduced to a minimum. The opto-magnetic disk of the present invention comprises recording areas having at least one of first and section magnetization saturation levels arranged respectively in the front of the unit recording areas. Thus, by the clamping method used in the unit for recording/reproducing as described above, the dynamic range of the circuit for reproducing recorded information can be minimized. In addition, it is not necessary to erase the entire surface of the disk, resulting in reduced manufacturing costs. Also, the disk supports the gain control technique described above.

What is claimed is:

1. A disk unit for recording and reproducing information on an opto-magnetic disk having unit recording areas of predetermined recording capacity arranged in the circumferential direction of the disk, said disk unit comprising:
   means for detecting a predetermined area existing in the front of each of said unit recording areas; and
   means for forming on said predetermined area at least one of a first saturation magnetization section wherein the magnetization is oriented to a first predetermined direction and a second saturation magnetization section wherein the magnetization is oriented to a second predetermined direction; and
   means for clamping a signal reproduced by said disk unit to a predetermined level.

2. A disk unit as claimed in claim 1 wherein both said first saturation magnetization section and said second saturation magnetization section are formed on said predetermined area by said means for forming.

3. A disk recording and reproducing system for a disk having unit recording areas of predetermined recording capacity arranged in the circumferential direction of the disk, said system including a recording unit and a reproducing unit, said recording and reproducing unit comprising:
    means in said recording unit for detecting a first predetermined area in said unit recording areas in which data will be recorded;
    means in said recording unit for detecting a second predetermined area in the front of each of said unit recording areas;
    means in said recording unit for erasing said first and second predetermined areas;
    means in said recording unit for recording at least one predetermined level of magnetization in at least a portion of said second predetermined area;
    means in said reproducing unit for detecting said recorded predetermined level and for generating an analog signal representing reproduced information, said analog signal varying between minimum and maximum voltages;
    analog-to-digital (A/D) conversion means for converting said analog signal to a digital signal;
    means responsive to said detected predetermined level of magnetization for adjusting at least one of said minimum and maximum voltages; and
    means in said reproducing unit responsive to said detected predetermined level of magnetization for recording at selected portions of said first predetermined area.

4. An opto-magnetic disk unit for reproducing information recorded on an opto-magnetic disk having unit recording areas of predetermined recording capacity arranged in the circumferential direction of the disk, and predetermined areas arranged in the front of said unit recording areas, said predetermined areas containing at least one of a first saturation magnetization section wherein the magnetization is oriented to a first predetermined direction and a second saturation magnetization section wherein the magnetization is oriented to a second predetermined direction, said opto-magnetic unit comprising:
    a pickup for reading said recorded information and for generating an output signal; and
    means for clamping to a predetermined level a part of the output signal of said pickup corresponding to the one saturation magnetization section of said predetermined areas; and
    processing means for performing signal processing on the output of said pickup clamped by said clamping means.

5. An opto-magnetic disk unit as claimed in claim 4 wherein said means for clamping comprises an analog switch and a capacitor.

6. A disk unit for reproducing information recorded on a disk having unit recording areas of predetermined recording capacity arranged in the circumferential direction of the disk, and predetermined areas respectively arranged in the front of said unit recording areas, said predetermined areas containing a first saturation magnetization section wherein the magnetization is oriented to a first predetermined direction and a second saturation magnetization section wherein the magnetization is oriented to a second predetermined direction, said unit comprising:
    a pickup for reading said recorded information and for generating an output signal; and
    differential signal generating means for generating a differential signal based on the level difference between the signal read from said first saturation magnetization section and the signal read from said second saturation magnetization section; and
    signal processing means for processing the output of said pickup with a gain determined in accordance with the level of said differential signal.

* * * * *